(12) United States Patent
Kawai

(10) Patent No.: US 6,724,520 B2
(45) Date of Patent: Apr. 20, 2004

(54) ELECTROPHORETIC DEVICE AND METHOD OF MANUFACTURING IT

(75) Inventor: Hideyuki Kawai, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 09/970,450

(22) Filed: Oct. 3, 2001

(65) Prior Publication Data

US 2002/0063673 A1 May 30, 2002

(30) Foreign Application Priority Data

Oct. 4, 2000 (JP) ........................................ 2000-304357

(51) Int. Cl.⁷ .............................................. H01L 27/00
(52) U.S. Cl. ........................................ 359/296; 345/107
(58) Field of Search ................................ 359/296, 321, 359/322, 323; 204/450, 600, 606; 345/105, 107

(56) References Cited

U.S. PATENT DOCUMENTS 5,961,804 A   10/1999  Jacobson et al.
6,137,553 A * 10/2000  Izumi et al. ................. 349/49

FOREIGN PATENT DOCUMENTS

| JP | 50-15115    | 6/1975  |
| JP | 2-51325     | 4/1990  |
| JP | 03-213827   | 9/1991  |
| JP | 09-185087   | 7/1997  |
| JP | 10-149118   | 6/1998  |
| JP | 2000 258805 | 10/1999 |

OTHER PUBLICATIONS

Communication from the EPO re counterpart application No. 01308454.6.

* cited by examiner

*Primary Examiner*—Scott J. Sugarman
*Assistant Examiner*—Richard Hanig
(74) *Attorney, Agent, or Firm*—Harness, Dickey & Pierce, P.L.C.

(57) ABSTRACT

An electrophoretic device is composed of a pair of electrodes that are arranged opposite to each other with a prescribed space therebetween, which contains an electrophoretic dispersion liquid containing electrophoretic particles which are dispersed in a liquid phase dispersion medium. At least one ferroelectric substance layer is arranged at a prescribed position within the space between the electrodes, and at least one of the electrodes is made of a transparent material. Applying a drive voltage between the electrodes, the electrophoretic particles are deposited on one electrode while ions of reverse polarity move towards another electrode, thus establishing the polarized state of the electrophoretic dispersion liquid, which is maintained for a long time due to the residual polarization characteristics of the ferroelectric substance layer.

29 Claims, 11 Drawing Sheets

ELECTROPHORETIC DEVICE AND METHOD OF MANUFACTURING IT

BACKGROUND OF THE INVENTION

1. Field of the Invention

This invention relates to electrophoretic devices such as electrophoretic displays which contain electrophoretic dispersion liquids containing electrophoretic particles dispersed in a liquid phase dispersion medium, wherein the electrophoretic dispersion liquid is arranged between electrodes that are arranged opposite to each other and are electrified to attract the particles in different directions respectively. In addition, this invention also relates to methods of manufacturing the electrophoretic devices.

2. Description of the Related Art

Japanese Unexamined Patent Publication No. Hei 9-185087 discloses the general structure of a conventional electrophoretic display. FIG. 8A shows a structure of the disclosed electrophoretic display, wherein an electrode 3 is arranged on a substrate 1 while a transparent electrode 4 is arranged below a transparent substrate 2. The space between these electrodes 3 and 4 is filled with electrophoretic dispersion liquid 50. In addition, spacers 7 are provided to prevent bleeding of the electrophoretic dispersion liquid 50 from the electrophoretic display. Incidentally, FIG. 8A shows only a selected section of the electrophoretic display for one pixel.

The electrophoretic dispersion liquid 50 contain electrophoretic particles 5 that are dispersed in liquid phase dispersion medium 6. Different colors are applied to the electrophoretic particles 5 and the liquid phase dispersion medium 6 respectively.

The electrophoretic display is connected to two voltage sources 9a and 9b by way of a switch 8. The voltage sources 9a and 9b apply voltages between the electrodes 3 and 4 with opposite polarities. That is, the electrode 4 is directly connected with the negative terminal of the voltage source 9a and the positive terminal of the voltage source 9b, whereas the electrode 3 is connected with either the positive terminal of the voltage source 9a or the negative terminal of the voltage source 9b by way of the switch 8. The aforementioned connections allow alternation of the polarity of the voltage by switching the switch 8. By simply changing the direction of the voltage applied between the electrodes 3 and 4, the electrophoretic dispersion liquid 50 is adequately subjected to polarization to enable the desired images to be displayed by the electrophoretic display. When selectively applying the voltage of the voltage source 9a between the electrodes 3 and 4 as shown in FIG. 8B, the electrophoretic particles 5 move towards the transparent electrode 4, which is observed by a human observer. In this state, the human observer views the color of the electrophoretic particles 5 with his/her eyes. When selectively applying the voltage of the voltage source 9b between the electrodes 3 and 4 as shown in FIG. 8C, the electrophoretic particles 5 move towards the electrode 3, which is arranged opposite to the transparent electrode 4 being observed by the human observer. In this state, the human observer views the color of the liquid phase dispersion medium 6.

The aforementioned structure of the electrophoretic display shown in FIG. 8A allows the human observer to view two colors, which can be displayed on the screen by switching the direction of the voltage applied between the electrodes 3 and 4. Therefore, the overall configuration of the electrophoretic display can be realized by providing the aforementioned structure for each pixel on the screen.

It is possible to produce an electronic paper by forming the aforementioned electrophoretic display on the flexible board or the like. Such electronic paper requires the displayed images to be retained over time. That is, once some display contents are written and are displayed on the electronic paper, it is necessary to retain the display contents even though a voltage is no longer applied.

Japanese Examined Patent Publication No. Sho 50-15115 teaches a technique for retaining the display contents. Specifically, it teaches the use of a specific dispersion medium that is solidified at normal temperatures and that can be softened by heat or a solvent. The aforementioned technique requires complicated steps in writing images, such as heating steps.

Japanese Unexamined Utility-Model Publication No. Hei 2-51325 discloses another technique that uses liquid crystal for the dispersion medium. However, this technique is disadvantageous because only a limited range of materials can be used for the dispersion medium.

U.S. Pat. No. 5,961,804 discloses an electrophoretic display having the specific structure in which charged elements having the polarity opposite to that of the particles are restrained inside of microcapsules containing dispersion liquids. However, it is very difficult to carry out the charge restraining method, which complicates the manufacturing processes. In addition, it is disadvantageous because only a limited range of materials can be used for the microcapsules.

Japanese Unexamined Patent Publication No. Hei 3-213827 discloses a technique for refreshing displayed images by periodically applying a drive voltage to the electrophoretic display. However, it is complicated in control and is disadvantageous because of the large consumption of electricity. For this reason, it is very difficult to apply the aforementioned technique to the electronic paper.

SUMMARY OF THE INVENTION

It is an object of the invention to provide an electrophoretic device that has remarkably improved display characteristics for retaining images on the screen when producing an electronic paper.

It is another object of the invention to provide a method for manufacturing the electrophoretic display with simple processes and practically without limitations in selecting the materials for use in the manufacture.

This invention provides unique and easy-to-manufacture structures for electrophoretic devices such as electrophoretic displays, in which an electrophoretic dispersion liquid containing electrophoretic particles dispersed in the liquid phase dispersion medium is contained in a space between electrodes, at least one of which is composed of transparent materials. This invention is characterized by arranging ferroelectric substance layers between the electrodes, which are arranged opposite to each other. The provision of the ferroelectric substance layers, which are arranged between the electrodes, allows the polarized state of the electrophoretic dispersion liquid to be maintained for a long time. Thus, it is possible to improve the image retaining capability of the electrophoretic device.

In the first aspect of the invention, the ferroelectric substance layers are connected in series within the space formed between the electrodes. Therefore, it is possible to enlarge the overall effective area of the ferroelectric substance layers, which makes it effectively maintain the polarized state of the electrophoretic dispersion liquid. In addition, it is possible to simplify the structure of the electrophoretic device, which can be manufactured with ease.

In the second aspect of the invention, ferroelectric substance layers are arranged in parallel between the electrodes. In this case, it is possible to reduce the drive voltage applied between the electrodes because of the parallel arrangement of the ferroelectric substance layers between the electrodes.

In the third aspect of the invention, there is further provided a switch enabling repetitive and reversible switching between the electrophoretic dispersion liquid and the ferroelectric substance layers to be electrically connected in series or in parallel. When the ferroelectric substance layers and the electrophoretic dispersion liquid are electrically connected in parallel, it is possible to reduce the drive voltage, which is applied between the electrodes. During the non-drive mode, the ferroelectric substance layers and the electrophoretic dispersion liquid are electrically connected in series, which makes it possible to effectively retain the polarized state of the electrophoretic dispersion liquid.

Because the ferroelectric substance layers are composed of organic polymer ferroelectric substances, it is possible to form the ferroelectric substance layers by prescribed printing and painting methods using an organic solvent solution, for example. This provides an easy way to manufacture the electrophoretic device.

At least one of the electrodes is partitioned into a plurality of sections in relation to a plurality of pixels on the screen. In addition, the ferroelectric substance layers can be also partitioned into a plurality of sections in relation to the pixels respectively. These sections of the ferroelectric substance layers are not necessarily provided for all of the pixels on the screen. Hence, it is possible to provide them for desired locations of the pixels respectively. This enables different contents to be displayed with respect to the pixels respectively. Therefore, it is possible to display the desired images on the screen.

The ferroelectric substance layer is formed by a prescribed method using an organic solvent solution for use in organic polymer ferroelectric substances and the like. As the prescribed method, it is possible to employ the inkjet printing method, screen process printing method, spin-coating method, roll-coating method, etc. These methods do not require the special equipment such as a vacuum chamber. Hence, it is possible to manufacture the electrophoretic device at a relatively low cost.

A first manufacturing method is to form the layer of the electrophoretic dispersion liquid after formation of the ferroelectric substance layers in accordance with a prescribed method. Thus, it is possible to provide a parallel arrangement of the ferroelectric substance layers, which create spaces for arranging microcapsules between the electrodes.

A second manufacturing method is to form the ferroelectric substance layers after the formation of the layer of the electrophoretic dispersion liquid in accordance with a prescribed method. Thus, it is possible to provide a serial arrangement of the ferroelectric substance layers within the space formed between the electrodes.

BRIEF DESCRIPTION OF THE DRAWINGS

These and other objects, aspects, and embodiments of the present invention will be described in more detail with reference to the following drawing figures, in which.

DESCRIPTION OF THE PREFERRED EMBODIMENTS

This invention will be described in further detail by way of examples with reference to the accompanying drawings.

Figure 2:
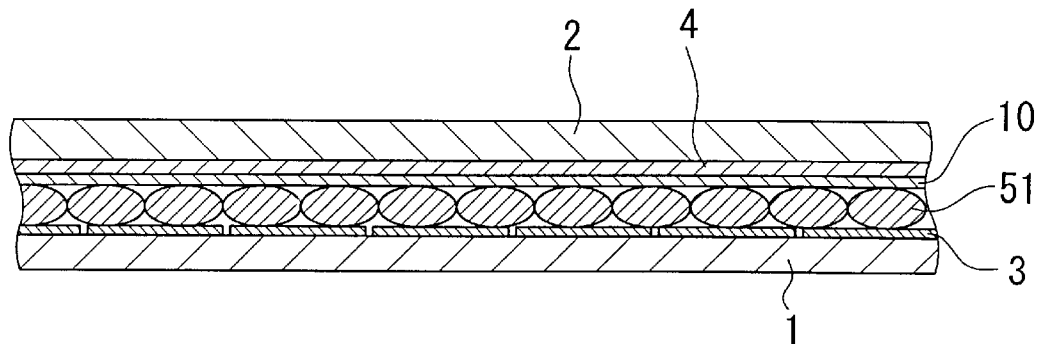
FIG. 2 is a sectional view showing the structure of the electrophoretic device of the first embodiment.
Figure 3:
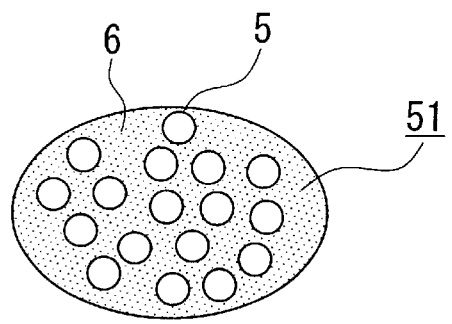
FIG. 3 diagrammatically shows an internal configuration of a microcapsule containing electrophoretic particles dispersed in a liquid phase dispersion medium.
Figure 8A:
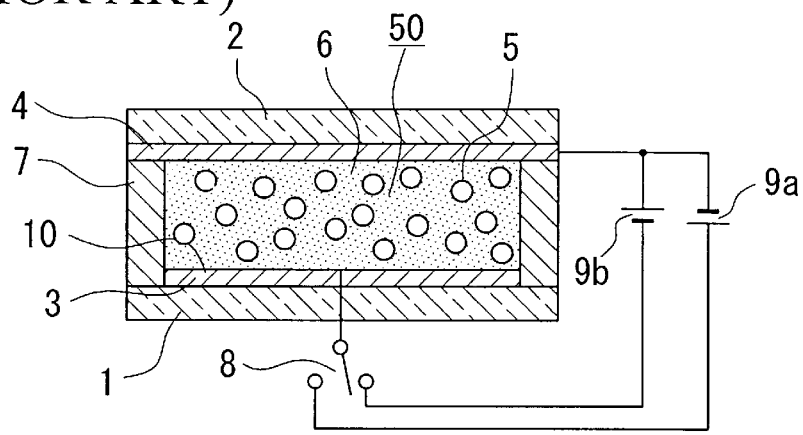
FIG. 8A is a sectional view showing the structure of a conventional electrophoretic display connected with voltage sources by way of a switch.
Figure 8B:
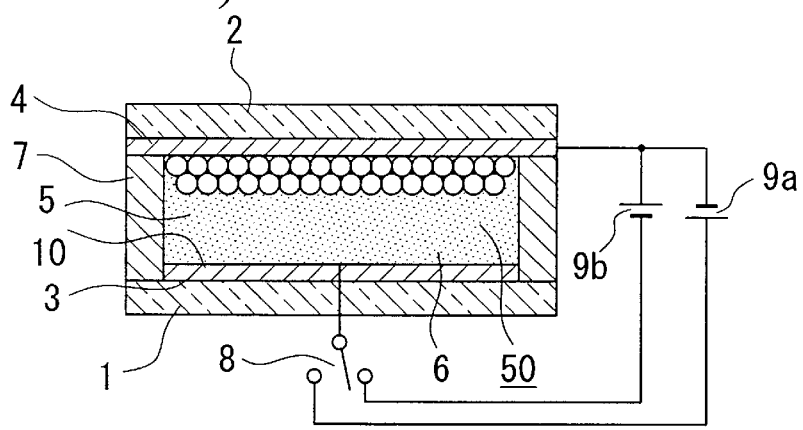
FIG. 8B is a sectional view showing a first electrified state of the electrophoretic device in which electrophoretic particles move upward due to application of voltage with a designated polarity.
Figure 8C:
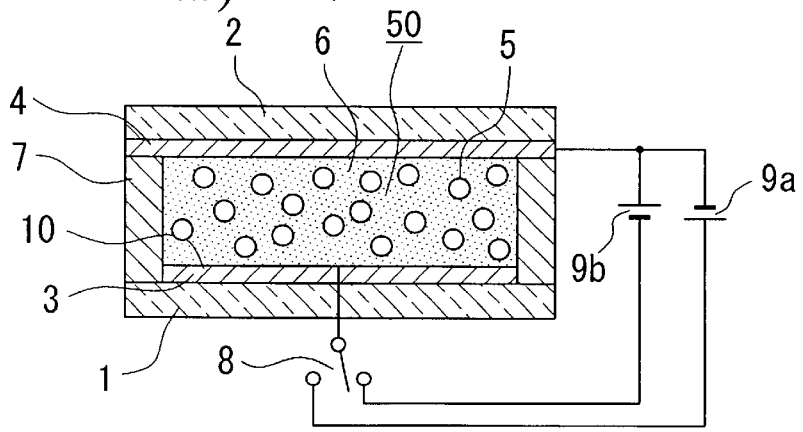
FIG. 8C is a sectional view showing a second electrified state of the electrophoretic display in which electrophoretic particles move downwards due to application of voltage with an opposite polarity.

FIG. 2 is a sectional view showing a structure of an electrophoretic device (namely, an electrophoretic display) in accordance with a first embodiment of the invention. The electrophoretic device is composed of a number of microcapsules 51 each encapsulating electrophoretic particles 5 and a liquid phase dispersion medium (namely, dispersion liquid) 6 as shown in FIG. 3. The microcapsules 51 are introduced into a binder and are colored in correspondence with the pixels. In the microcapsule 51 shown in FIG. 3, the dispersion liquid 6 also contain ions whose polarity is opposite to that of the electrophoretic particles 5. Due to the application of a prescribed voltage between two electrodes which are arranged opposite to each other, the electrophoretic particles 5 move towards on one electrode while the ions having the opposite polarity move towards another electrode. In the electrified state shown in FIG. 8B, the dispersion liquid 6 is subjected to a polarization that allows the coexistence of electric dipoles.

To improve the ability of the electrophoretic display to retain images on the screen, it is necessary to maintain the electric dipoles after voltage application is terminated. For this reason, the present embodiment provides a ferroelectric substance layer 10, whereby the polarized state is maintained by using the ferroelectric substances' residual polarization characteristics.

That is, after a certain display content is written to the electrophoretic display by applying an appropriate voltage, the display is maintained for a time even though the voltage application is terminated. Therefore, it is possible to provide the electronic paper whose display contents can be adequately updated or rewritten. However, if the electronic paper is made using the conventional electrophoretic display, it is difficult to maintain display contents (e.g., images) on the screen for a long time after the termination of the application of a voltage. To maintain display contents on the screen for a long time, it is proposed to use the ferroelectric substance layer 10 arranged between the electrodes. Specifically, the series connection or parallel connection of ferroelectric substances can ensure that the polarized state persists for a long time.

FIG. 2 shows the series connection of ferroelectric substances, which are connected in series to form the ferroelectric substance layer 10 that is arranged between the electrode 3 and the transparent electrode 4. FIG. 2 shows an example of the structure in which the ferroelectric substance layer 10 corresponding to the series connection of ferroelectric substances is arranged below and in contact with the transparent electrode 4. Of course, it is possible to arrange the ferroelectric substance layer 10 above and in contact with the electrode 3. The electrode 3 is divided into a number of pieces in correspondence with the pixels. Instead of dividing the electrode 3, it is possible to divide the transparent electrode 4 into a number of pieces in correspondence with the pixels. In short, at least one of the electrode 3 and transparent electrode 4, which are arranged opposite to each other across the prescribed space, is partitioned into a number of sections, which form the pixels on the screen.

Figure 1A:
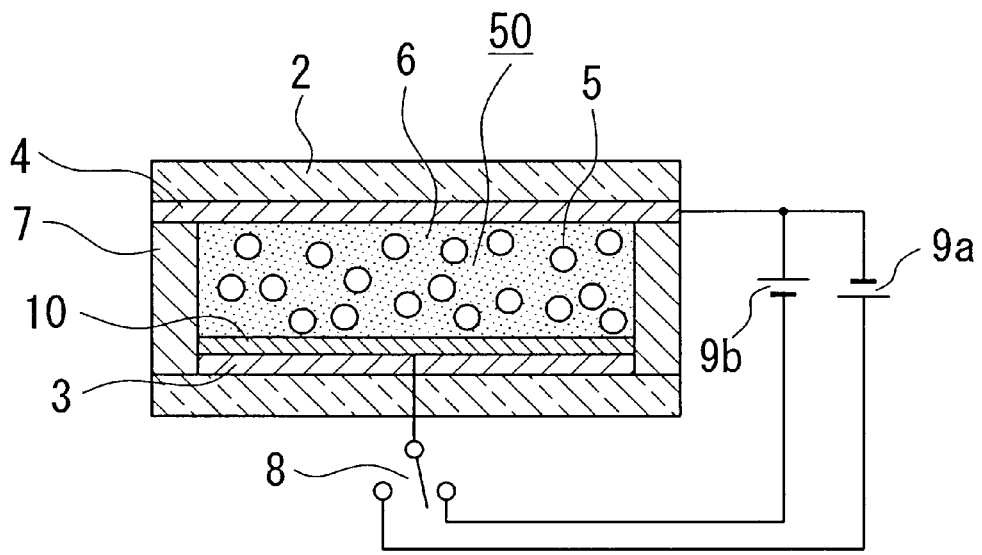
FIG. 1A is a simplified illustration showing the internal configuration of an electrophoretic device in accordance with a first embodiment of the invention.
Figure 1B:
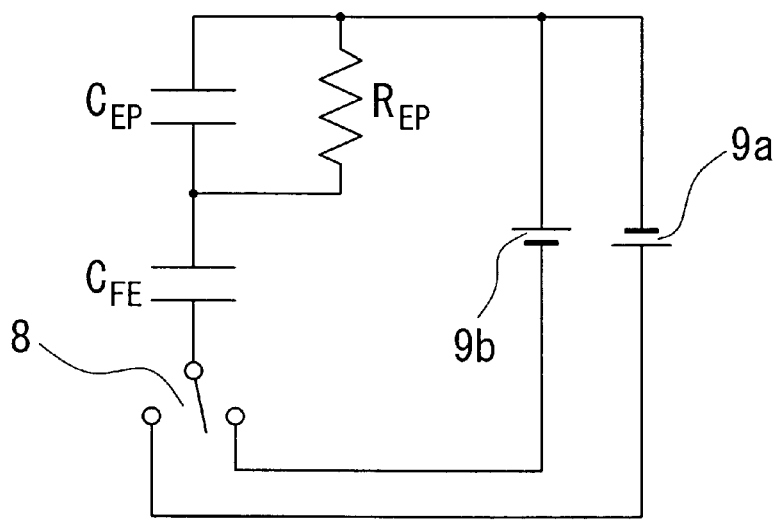
FIG. 1B is a circuit diagram showing an equivalent circuit that is electrically equivalent to the electrophoretic device shown in FIG. 1A.

Due to the aforementioned structure, it is possible to establish an in-series electric connection between the electrophoretic dispersion liquid 50 and the ferroelectric substance layer 10, which is shown in FIG. 1A. Suppose that the electrophoretic dispersion liquid 50 has a resistance $R_{EP}$ and a capacitance $C_{EP}$ while the ferroelectric substance layer has a capacitance $C_{FE}$. The structure of the electrophoretic device of FIG. 1A can be described by the equivalent circuit shown in FIG. 1B in which a parallel circuit consisting of a resistor $R_{EP}$ and a capacitor $C_{EP}$ is connected in series with a capacitor $C_{FE}$. In FIG. 1B, the voltage source 9a or 9b provides the application of a voltage $V_{in}$, by which the electrophoretic dispersion liquid 50 bears partial voltage $V_{EP}$ while the ferroelectric substance layer 10 bears partial voltage $V_{FE}$. In this case, the following equation applies for the serial connection of the electrophoretic dispersion liquid 50 and the ferroelectric substance layer 10.

$$V_{in}=V_{EP}+V_{FE} \tag{1}$$

After application of the voltage $V_{in}$, the aforementioned equivalent circuit provides the following partial voltage ratio.

$$V_{EP}:V_{FE}=C_{FE}:C_{EP} \tag{2}$$

To operate the equivalent circuit under the aforementioned relationship, it is necessary to apply a prescribed value of the voltage $V_{in}$ that is determined so as to satisfy the inequality '$V_{FE}$ (polarization inversion voltage)'. As a prescribed material of vinylidene/trifluoroethylene (VDF/TrFE) is used for the ferroelectric substance, for example, it is possible to determine a relationship of '$V_{FE}$ 8 V' in consideration of the galvano-electric field of approximately 40 V/m if the ferroelectric substance layer 10 has a thickness of 200 nm. If $C_{FE}:C_{EP}=2:1$, it is possible to determine a relationship of '$V_{in}$ 24 V'. Then, even when the switch 8 is turned off, in other words, even if the equivalent circuit of FIG. 1B is opened, it is possible to maintain the polarized state of the electrophoretic dispersion liquid 50 due to the residual polarization of the ferroelectric substance.

Figure 4:
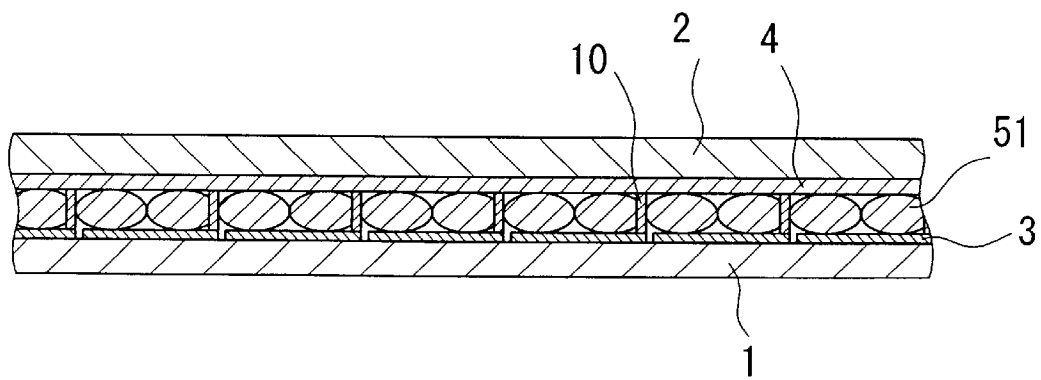
FIG. 4 is a sectional view showing the structure of an electrophoretic device in accordance with a second embodiment of the invention.

FIG. 4 shows another structure of the electrophoretic device, which provides a parallel connection of ferroelectric substances, which are connected in parallel to form a ferroelectric substance layer 10 that is arranged between the electrode 3 and the transparent electrode 4. Herein, the electrode 3 is partitioned into a number of sections to provide a number of pixels on the screen. In addition, the ferroelectric substance layer 10 is also partitioned into a number of sections in correspondence with the pixels.

Figure 5A:
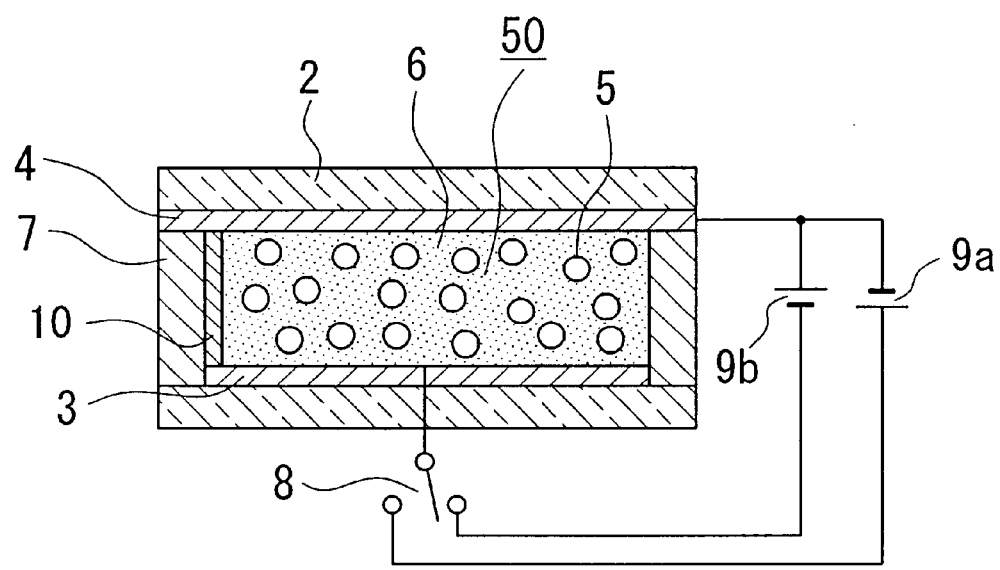
FIG. 5A is a simplified illustration showing the internal configuration of the electrophoretic device of the second embodiment.
Figure 5B:
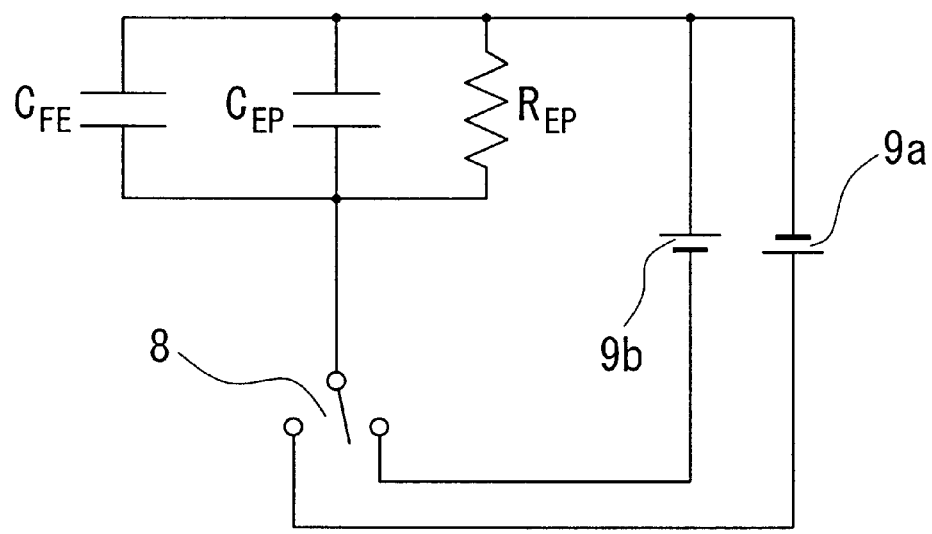
FIG. 5B is a circuit diagram showing an equivalent circuit that is electrically equivalent to the electrophoretic device shown in FIG. 5A.

FIG. 5A shows an internal configuration of the electrophoretic device that provides a parallel connection of ferroelectric substance layers 10, wherein the ferroelectric substance layers 10 are arranged vertically between the electrode 3 and the transparent electrode 4. The electrophoretic device of FIG. 5A can be described by the equivalent circuit of FIG. 5B, wherein all of the capacitor $C_{EP}$, resistor $R_{EP}$ and capacitor $C_{FE}$ are connected in parallel. In FIG. 5B, the voltage source 9a or 9b applies a voltage $V_{in}$ by which the electrophoretic dispersion liquid 50 bears partial voltage $V_{EP}$ while the ferroelectric substance layer 10 bears partial voltage $V_{FE}$. The parallel circuit shown in FIG. 5B establishes the following relationship.

$$V_{in}=V_{EP}=V_{FE} \tag{3}$$

To operate the aforementioned equivalent circuit of FIG. 5B, it is necessary to apply a relatively large value of voltage $V_{in}$ that is equal to or larger than the polarization inversion voltage, which satisfies the prescribed relationship of '$V_{in}$ 20V' if the ferroelectric substance layer 10 having a prescribed thickness of 500 nm is made of a prescribed material of VDF/TrFE, for example. Then, even when the switch 8 is turned off so that the equivalent circuit of FIG. 5B is opened, it is possible to maintain the polarized state of the electrophoretic dispersion liquid 50 due to the residual polarization of the ferroelectric substances.

Figure 9:
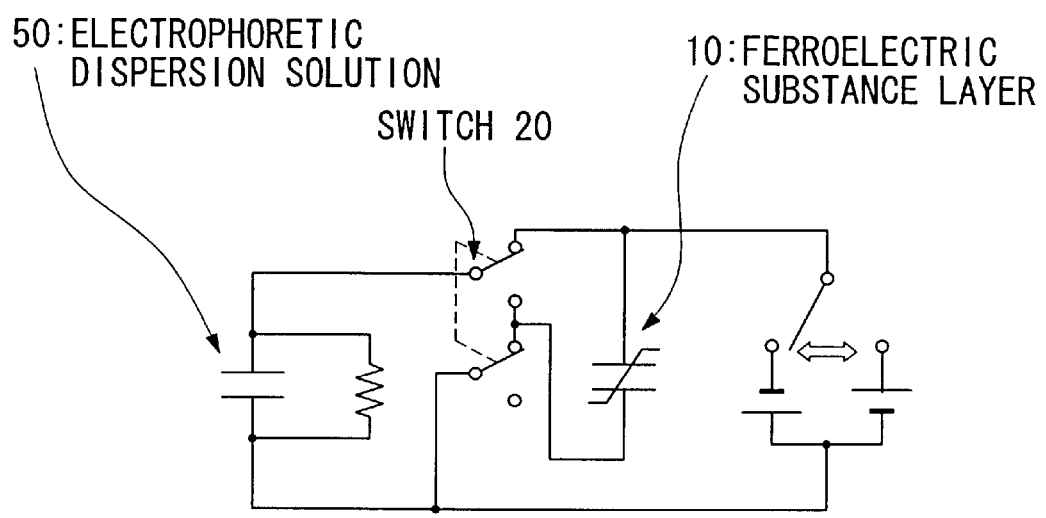
FIG. 9 is a circuit diagram showing an equivalent circuit representing operations of the electrophoretic device that is partially modified to realize switching between the serial connection and parallel connection to be established between the electrophoretic dispersion liquid and ferroelectric substance layer.

The electrophoretic device can be partially modified to carry out switching between the serial connection and parallel connection for the electrophoretic dispersion liquid 50 and the ferroelectric substance layer 10. FIG. 9 shows an equivalent circuit for the modified electrophoretic device, wherein a parallel circuit consisting of a resistance and a capacitance is the electrical equivalent of the electrophoretic dispersion liquid 50, while the variable capacitance is the electrical equivalent of the ferroelectric substance layer 10. In addition, a switch 20 is connected between the parallel circuit and the variable capacitance to provide the repetitive or reversible switching between a serial connection and a parallel connection. During the drive mode in which the drive voltage is continuously applied to the electrophoretic device, the electrophoretic dispersion liquid 50 and the ferroelectric substance layer 10 are electrically connected in parallel. This is advantageous because the drive voltage can be reduced in the drive mode. In the non-drive mode, the electrophoretic dispersion liquid 50 and the ferroelectric substance layer 10 are electrically connected in series. In the non-drive mode, it is possible to effectively maintain the polarized state of the electrophoretic dispersion liquid.

The material for use in the ferroelectric substance connected in series or in parallel is selected from among inorganic dielectric materials, organic polymer dielectric materials and their complex materials. Specifically, it is necessary to select materials from among the aforementioned materials that solidify at normal temperatures and that have a sufficiently high Curie point. As the inorganic dielectric materials, it is possible to use lead zirconate titanate (PZT), barium titanate ($BaTiO_3$), lead titanate, and the like. As the organic polymer dielectric materials, it is possible to use polyvinylidene fluoride (PVDF), copolymers of vinylidene (VDF)/trifluoethylene (TrFE), copolymers of vinylidene cyanide (VDCN)/vinyl acetate (VAc), and the like. It is also possible to use a complex material that is made by dispersing micro-powders of the aforementioned inorganic dielectric materials into a polymer matrix made of PVDF or rubber.

The electrophoretic device shown in FIG. 2 is constituted so as to provide ferroelectric substance layers in correspondence with the pixels. It is not always required to provide a ferroelectric substance layer for each pixel. Hence, it is possible to provide the ferroelectric substance layers for only selected pixels that have a reduced image maintaining capability. To realize functions of an electronic paper, it is necessary to write display data to electrodes, which are arranged in proximity to the end portions of the electronic paper. In this case, it can be assumed that pixels, which are far from the electrodes, may have a reduced image maintaining capability compared with other pixels. Therefore, the ferroelectric substance layers can be provided for these pixels.

Next, a method for manufacturing the aforementioned electrophoretic device (or electrophoretic display) will be described in detail.

Figure 6A:
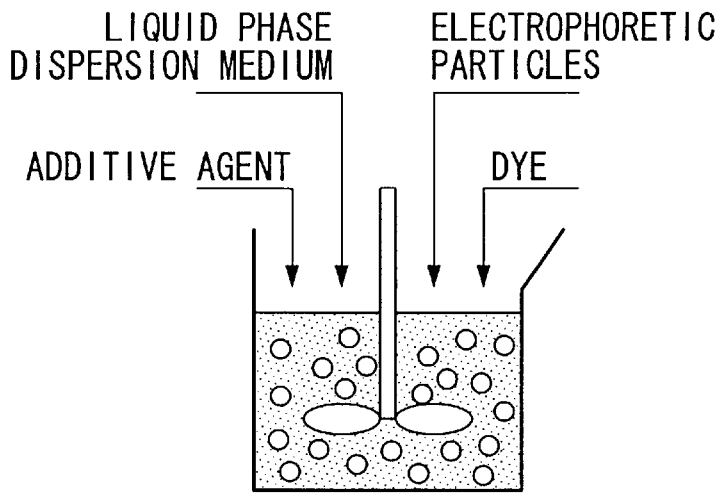
FIG. 6A diagrammatically shows a step for producing the electrophoretic dispersion liquid.
Figure 6B:
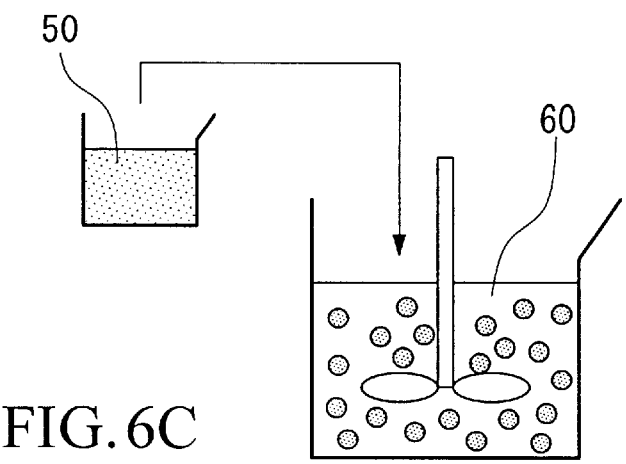
FIG. 6B diagrammatically shows a step for formation of capsule walls within the electrophoretic dispersion liquid by emulsification.
Figure 6C:
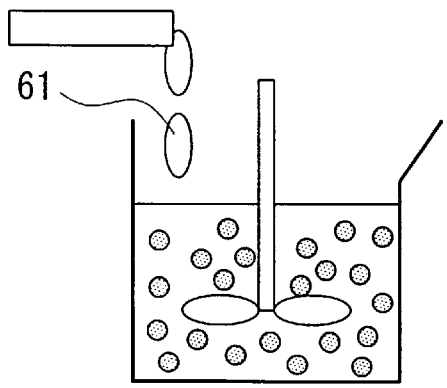
FIG. 6C diagrammatically shows a step for hardening the capsule walls by adding hardening agents.

First, a method for producing the microcapsules enclosing the electrophoretic dispersion liquid will be described with reference to FIGS. 6A to 6C. As shown in FIG. 6A, the liquid phase dispersion medium, electrophoretic particles, dye, and additive agent are put into a container and are stirred. Stirring provides the electrophoretic dispersion liquid 50. Then, as shown in FIG. 6B, the electrophoretic dispersion liquid 50 is put into a container in which it is stirred together with water and capsule wall materials 60. The stirred solution is subjected to emulsification to form the capsule walls. Finally, as shown in FIG. 6C, an emulsifier 61 is introduced into the container to harden the capsule walls.

As the liquid phase dispersion medium, it is possible to use water; alcohol solvents such as methanol, ethanol, isopropanol, butanol, octanol, and methyl cellusolve; esters such as ethyl acetate, and butyl acetate; ketones such as acetone, methyl ethyl ketone, methyl isobutyl ketone; aliphatic hydrocarbons such as pentane, liexane, and octane; alicyclic hydrocarbons such as cyclohexane, and methyl cyclohexane; aromatic hydrocarbons of the benzene family having long-chain alkyl groups such as benzene, toluene, xylene, hexylbenzene, heptylbenzene, octylbenzene, nonylbenzene, decylbenzene, undecylbenzene, dodecylbenzene, tridecylbenzene, and tetradecylbenzene; and halogenated hydrocarbons such as chloroform, carbon tetrachloride, and 1,2-dichloroethane. In addition, it is possible to use carboxylic acid or other oil materials. Herein, any of the oil materials can be independently used for the liquid phase dispersion medium. Alternatively, it is possible to use specific materials corresponding to mixtures of the oil materials mixed with surface active agents.

The electrophoretic particles can be organic or inorganic particles (or polymers or colloids) that tend to move due to potential differences in the dispersion medium under the influence of electrophoretic effects. The electrophoretic particles can be colored by using one pigment, or two or more pigments that have specific colors such as black, white, yellow, red, blue, and green. As black pigments, it is possible to use aniline black, and carbon black. As white pigments, it is possible to use titanium dioxide, zinc white, and antimony trioxide. As azo pigments, it is possible to use monoazo, disazo, and polyazo. As yellow pigments, it is possible to use isoindolynone, yellow lead, yellow iron oxide, cadmium yellow, titan yellow, and antimony. As red pigments, it is possible to use quinacrine red, and chrome bar million. As blue pigments, it is possible to use phthalocyanine blue, induslene blue, anthraquinone dye, ion blue, ultramarine blue, and cobalt blue. As green pigments, it is possible to use phthalocyanine green.

It is possible to add other materials or agents to the aforementioned pigments as necessary. As additive materials or agents, it is possible to use electrolytic elements, surface active agents, metal soap, resin, rubber, oil, varnish, charged control agents containing particles such as compounds, dispersing agents (such as titanium coupling agents, aluminum coupling agents, and silane coupling agents), lubricants, and stabilizing agents.

The dispersion liquid that is composed as described above is subjected to sufficient admixture by an appropriate method, such as one using a ball mill, sand mill, and-paint shaker. Then, the dispersion liquid is subjected to microencapsulating by an known microencapsulating method such as interfacial polymerization, an insolubilized reaction method, phase separation method, and interfacial precipitation.

As the materials for use in formation of the microcapsules 51, it is preferable to use flexible materials such as compounds of Arabic rubber and gelatin, and urethane compounds. In order to demonstrate superior display properties, it is preferable that microcapsules 51 have an approximately uniform size. Microcapsules having an approximately uniform size can be produced by filtration or specific gravity difference separation. Normally, the size of the microcapsules ranges between 30 m and 60 m, for example.

In the formation of the microcapsule layer, the microcapsules 51 are mixed together with the desired dielectric constant adjusting agent within the binder resin, so that a resin composition (e.g., emulsion or organic solvent solution) is produced. Thus, the microcapsule layer is formed on the substrate by a known coating method such as the roll coater method, roll laminator method, screen process printing method, and spray method.

There are not practical limitations on the materials for use in the binder resin as long as the materials have good affinity with the microcapsules 51, superior adhesion to the substrate, and insulating characteristics.

As the materials for use in the binder resin, it is possible to use polyethylene, chlorinated polyethylene, copolymers of ethylene and vinyl acetate, copolymers of ethylene and ethyl acrylate, polypropylene, ABS resin, methyl methacrylate resins, vinyl chloride resins, copolymers of vinyl chloride and vinyl acetate, copolymers of vinyl chloride and vinylidene chloride, copolymers of vinyl chloride and acrylic ester, copolymers of vinyl chloride and methacrylic acid, copolymers of vinyl chloride and acrylonitrile, copolymers of ethylene, vinyl alcohol and vinyl chloride, copolymers of propylene and vinyl chloride, vinylidene chloride resin, vinyl acetate resin, polyvinyl alcohol, polyvinyl formal, thermoplastic resins such as cellulose resins, polyamide resins, polyacetal, polycarbonate, polyethylene terephthalate, polybutylene terephtalate, polyphenylene oxide, polysulfone, polyamideimide, polyamino-bismaleimide, polyester sulfone, polyphenylene sulfone, polyacrylate, graft polyphenylene-eter, polyeter eter-ketone, high polymers such as polyeterimide, poly-tetrafluoroethylene, poly-ethylenepropylene fluoride, copolymers of tetrafluoroethylene and perphloroalkoxyethylene, copolymers of ethylene and tetrafluoroethylene, poly-vinylidene fluoride, polychlorotrifluoroethylene, fluoro-resins such as fluororubber, silicone resin, and other silicon resins such as silicone rubber. In addition, it is possible to use copolymers of methacrylic acid and styrene, polybutylene, and copolymers of methyl methacrylic acid, butadiene and styrene.

As disclosed by Japanese Unexamined Patent Publication No. Hei 10-149118, it is preferable that dielectric constants of the electrophoretic solution and dispersed materials are set to approximately the same value with respect to the binder material. For this reason, it is preferable to add alcohols, ketones, carboxylic acid, and the like to the binder resin composition, for example. As the alcohols, it is possible to use 1,2-butanediol, 1,4-butandiol, etc.

Figure 7:
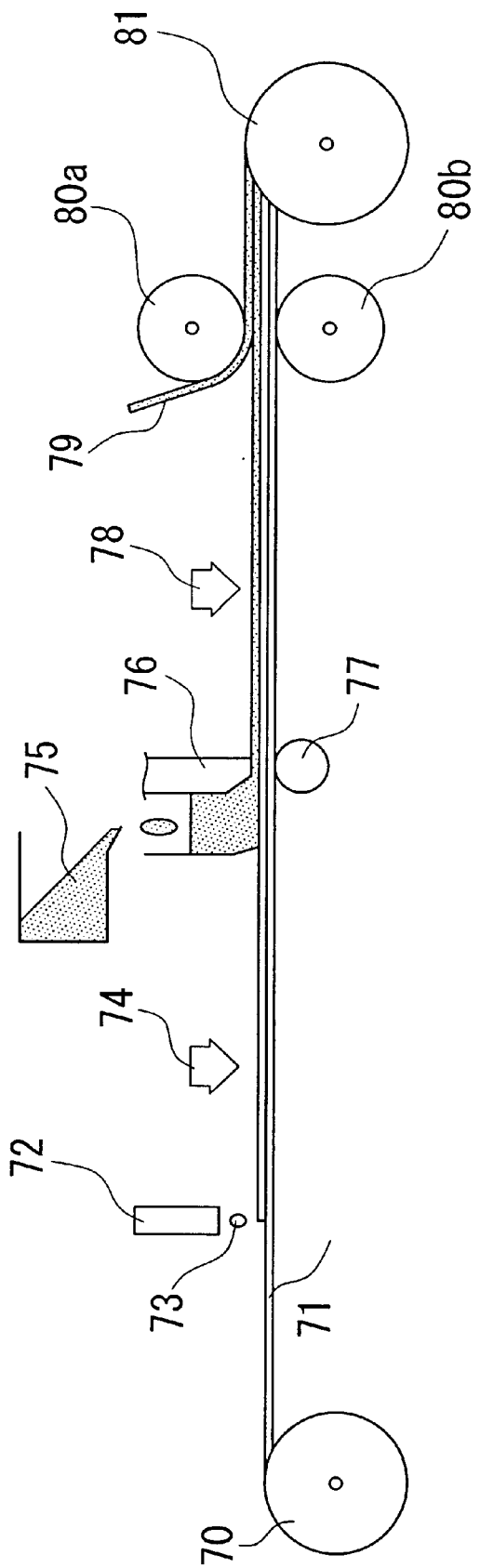
FIG. 7 shows a mechanical manufacturing line for producing the electrophoretic device of the first embodiment whose structure is shown in FIG. 2.

With reference to FIG. 7, a description will be given with respect to a method for manufacturing the electrophoretic device having the structure shown in FIG. 2, in which dielectric substances are connected in series in the ferroelectric substance layer 10 arranged between the electrodes 3 and 4, by using microcapsules, which are produced by the foregoing steps shown in FIGS. 6A to 6C.

In FIG. 7, there is provided a roll of transparent substrate material 71, on which the structure of the electrophoretic device is to be formed by the roll-to-roll method and inkjet manufacture method. As the rolled transparent substrate material 71, it is possible to use a composition in which an ITO electrode film (where 'ITO' stands for 'Indium Tin Oxide') is formed on a heat-resistant film, for example. It is also possible to use a composition in which an ITO electrode film is formed on a PET substrate. The ITO electrode film is realized by the tin-doped indium oxide film. Instead, it is possible to realize the electrode film by fluorine-doped tin oxide film (i.e., FTO film), antimony-doped zinc oxide film, indium-doped zinc oxide film, aluminum-doped zinc oxide film, and the like.

The transparent substrate material 71 is output from a roller 70 and is subjected to painting with an organic polymer ferroelectric substance solution 73 by the inkjet printing method. That is, a nozzle 72 sprays the organic polymer ferroelectric substance solution 73 towards the ITO electrode film formed on the transparent substrate material 71. As the organic polymer ferroelectric material, it is necessary to use organic polymer ferroelectric substances having solvent solubility. For example, it is possible to use a copolymer of VDF/TrFE.

Then, the organic polymer ferroelectric substance solution 73 sprayed on the ITO electrode film of the transparent substrate material 71 is subjected to annealing by hot air 74 to perform recrystallization. During the annealing, the temperature of the hot air 74 should be equal to the heat-resistant temperature of the heat-resistant film or PET, which is used for the rolled transparent substrate material 71, or less. That is, it is appropriate to set the temperature of the hot air 74 at 145 or so.

The conditions for film formation depend upon the dielectric constants of the dielectric substance layer, which are required for the electrophoretic device. In general, the voltage applied to the dielectric substance layer and electrophoretic dispersion liquid increases or decreases in proportion to the inverse of the dielectric constant. Therefore, the film thickness should be determined in consideration of the dielectric constant. Preferably, the film thickness approximately ranges between 100 nm and 1 m.

Next, microcapsule-dispersed solution is produced by the foregoing steps shown in FIGS. 6A to 6C. The microcapsule-dispersed solution is mixed with a water-soluble binder to produce the liquid 75, which is then coated to the layer of the 'annealed' organic polymer ferroelectric substance solution 73 formed on the ITO electrode film of the transparent substrate material 71 by means of a knife coater 76 and a roll 77. As the water-soluble binder, it is possible to use the silicone coating agent, for example. Then, the layer of the 'coated' water-soluble binder on the transparent substrate material 71 is subjected to a drying operation by hot air 78. The temperature of the hot air 78 is set to 90 approximately. Incidentally, the mixing ratio of binder in the liquid 75 and the coat thickness are determined in consideration of the thickness of the 'dried' microcapsule layer.

Then, the transparent substrate material 71 having the ITO electrode film, organic polymer dielectric substance layer, and microcapsule layer is laminated with a roll substrate material 79 by means of rollers 80a and 80b. Finally, the 'laminated' substrate material is wound around a roller 81. Incidentally, the roll substrate material 79 has a laminated structure in which electrode patterns are formed on the plastic film made of PET or PI, for example. By carrying out the aforementioned processes, it is possible to produce the electrophoretic device of FIG. 2 in which the organic polymer ferroelectric substance layer is formed on the microcapsule layer.

To produce the electrophoretic device of FIG. 1 in which the organic polymer ferroelectric substance layer is formed below the microcapsule layer, it is necessary to change the order of the aforementioned processes, which are described with reference to FIG. 7. That is, the coating process of the organic polymer ferroelectric substance solution 73 and the annealing process using hot air 74 are performed after the coating process of the liquid 75, in which the water-soluble binder is mixed with the microcapsule-dispersed solution, and then the drying process using the hot air 78 is carried out.

Next, a description will be given with respect to a method for manufacturing an electrophoretic device having the aforementioned structure shown in FIG. 4 in which ferroelectric substance layers 10 are connected in parallel between the electrodes 3 and 4. First, the inkjet printing method is used to form and dry the ferroelectric substance layers 10, which are electrically connected in parallel between the electrodes 3 and 4 as shown in FIG. 4. Gaps formed between the ferroelectric substance layers 10 are coated with the above-described liquid, which is a mixture of the microcapsule-dispersed solution and the water-soluble binder. Then, the formed structure is dried and is laminated with the roll substrate material. After completion of the aforementioned processes, it is possible to produce the electrophoretic device in which the organic polymer ferroelectric substance layers are formed in the gaps between the microcapsule layers.

In the above, the ferroelectric substance layers are formed by the inkjet printing method. Of course, it is possible to employ other known methods such as the screen process printing method, the offset printing method, spin-coating method, and roll-coating method, for example. Using these methods, it is possible to manufacture electrophoretic devices such as electrophoretic displays without using special equipment such as vacuum chambers.

Incidentally, the aforementioned electrophoretic devices can be driven by either the active method or passive method.

The electrophoretic device of this invention is applicable to a variety of electronic devices having displays. Next, descriptions will be given with respect to examples of the electronic devices, each of which is able to use the electrophoretic device of this invention.

1. Mobile Computer

Figure 10:
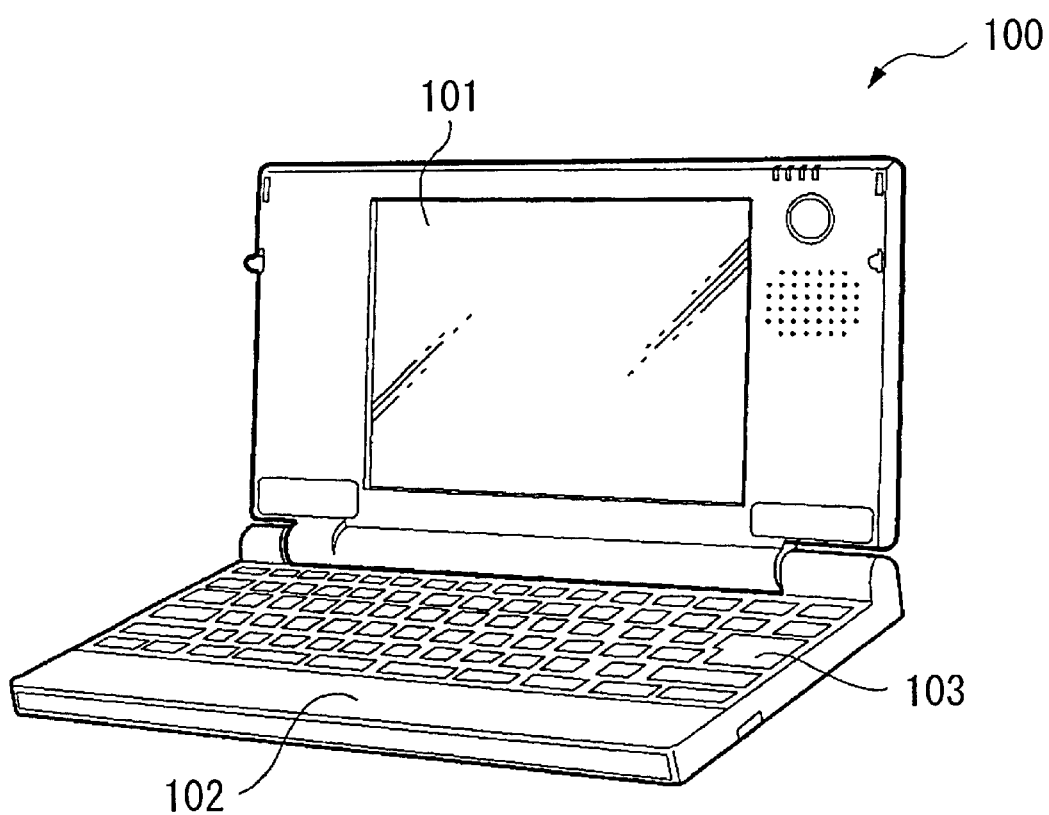
FIG. 10 is a perspective view showing an external appearance of a mobile personal computer whose display corresponds to the electrophoretic display.

A brief description will be given with respect to an example of a personal computer 100 of a mobile type (or a portable type) that uses an electrophoretic device of this invention as a display 101. FIG. 10 shows an external appearance of the personal computer 100, which basically comprises a main unit 102 providing a keyboard 103.

2. Cellular Phone

Figure 11:
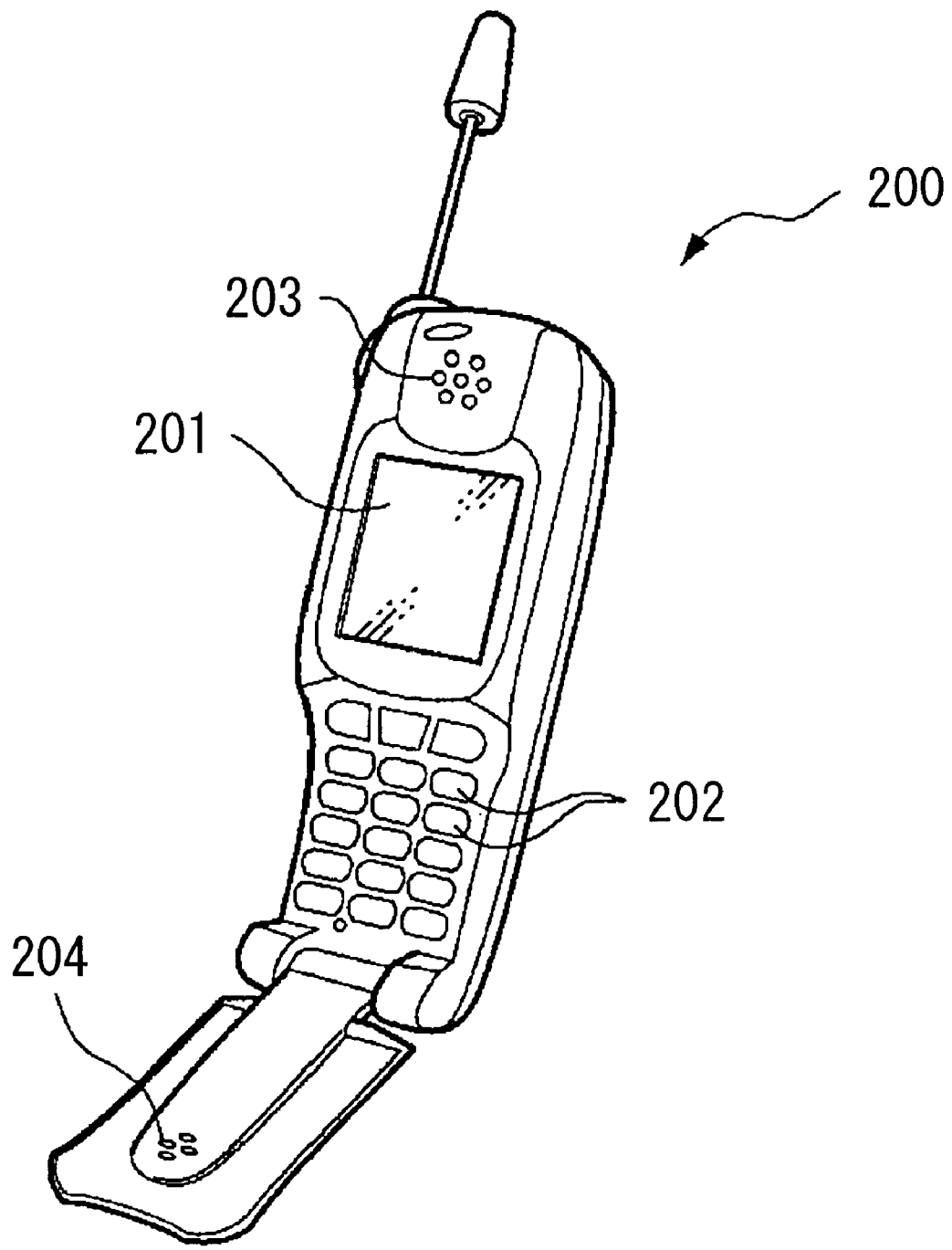
FIG. 11 is a perspective view showing an external appearance of a cellular phone whose display corresponds to the electrophoretic display.

A brief description will be given with respect to an example of a cellular phone 200 that uses an electrophoretic device of this invention as a small-size display 201. FIG. 11 shows an external appearance of the cellular phone 200, which basically comprises numeric keys and function keys 202, an earpiece 203, and a mouthpiece 204.

3. Electronic Paper

Figure 12:
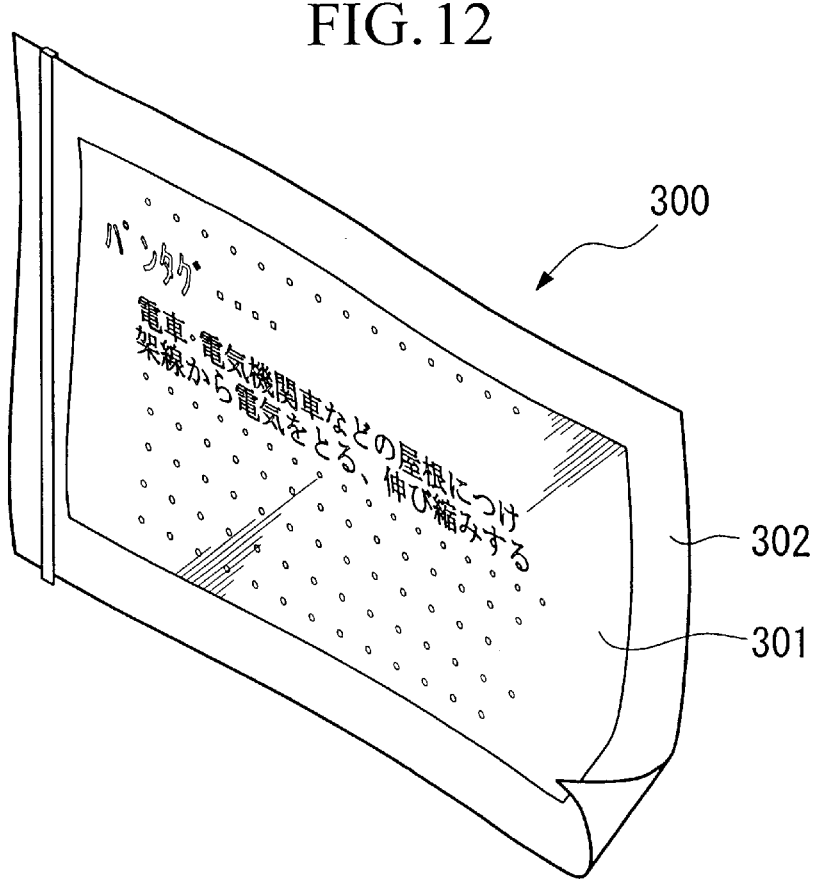
FIG. 12 is a perspective view showing an electronic paper whose display corresponds to the electrophoretic display.

A brief description will be given with respect to an example of a 'flexible' electronic paper 300 that uses an electrophoretic device of this invention as a display 301. FIG. 12 shows an external appearance of the electronic paper 300, which basically comprises a rewritable sheet 302 that has similar touch and flexibility of conventional papers.

Figure 13:
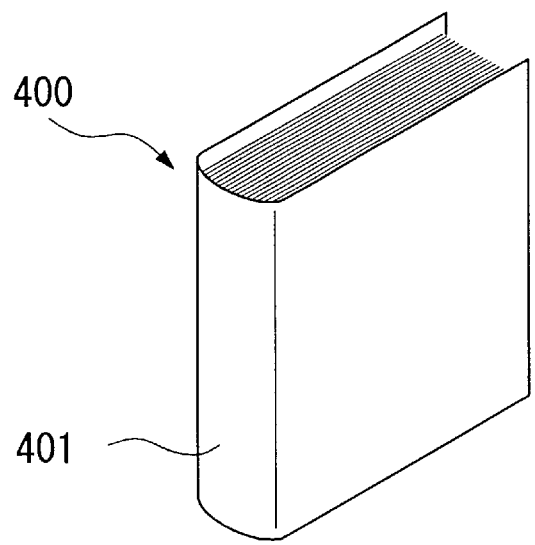
FIG. 13 is a perspective view showing an electronic notebook for binding together electronic papers.

FIG. 13 shows an external appearance of an electronic notebook 400 in which a number of electronic papers 300 are bound together with a note cover 401. The note cover 401 provides a display data input device (not shown) that is used to input display data from the external device. In response to the display data, it is possible to change or update the display content with respect to each of the electronic papers 300 bound together with the note cover 401.

4. Display Device

Figure 14A:
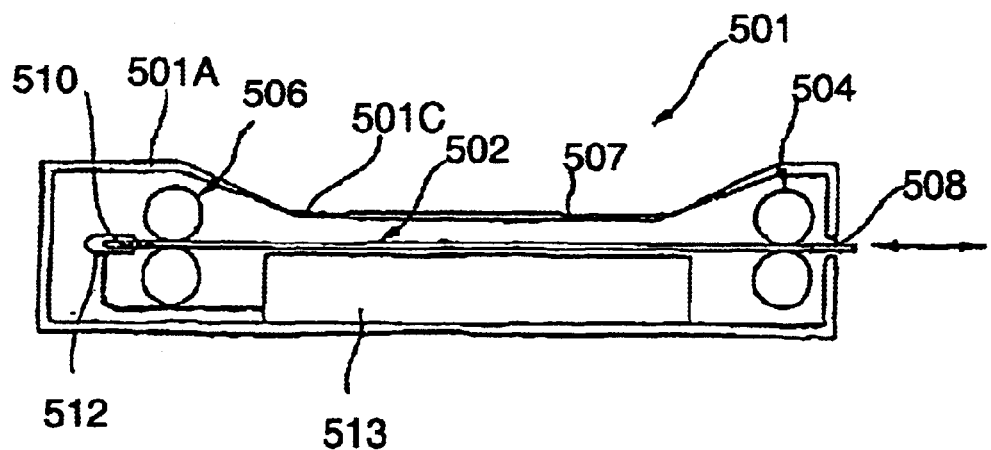
FIG. 14A is a sectional view showing an internal structure of a display device using a detachable display unit.
Figure 14B:
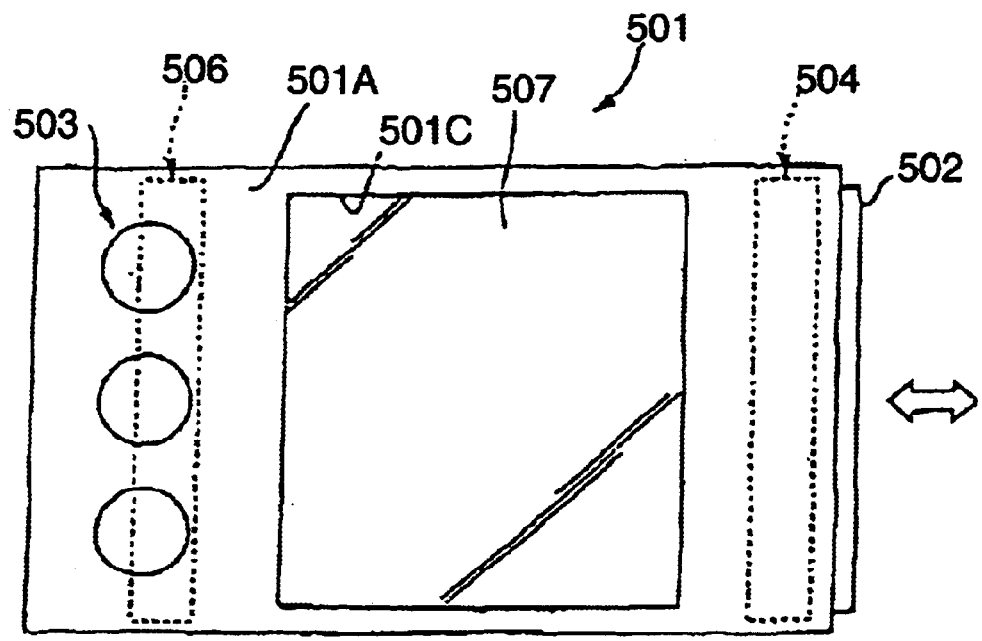
FIG. 14B is a front view of the display device whose center portion is made concave to provide a transparent glass sheet for viewing pictures and characters displayed on a screen of the display unit, which is inserted into the display device.

A brief description will be given with respect to an example of a display device 501 with reference to FIGS. 14A and 14B. A display unit 502 is fixed to a frame 501A of the display device 501 and is of a structure as being attachable to and detachable from the frame 501A. The display unit 502 is an extremely thin sheet-shaped or paper-shaped recording medium (namely, an electronic paper), and is held between two pairs of feed rollers 504 and 506, which are arranged at prescribed positions in side portions of the frame 501A. Approximately the center portion of the frame 501A is made concave to form a rectangular port 501C to which a transparent glass plate 507 is fitted. The frame 501A provides an insertion/removal slot 508 that allows insertion of the display unit 502 thereto and removal of the display unit 502 therefrom. A terminal unit 510 is provided at an end of the insertion direction of the display unit 502. The terminal unit 510 is electrically connected to a socket 512 in the frame 501A, by which it is connectable to a controller 504 provided in the other side portion of the frame 501A.

This type of the detachable display unit 502 provides portability for the user, and it is easily handled by the user, but is not bulky. Therefore, the user is able to carry around only the display unit 502 displaying the map regarding the area of the user's destination.

Other than the aforementioned examples, it is possible to list other examples such as the liquid crystal display television set, videotape recorder of the viewfinder type or monitor type, car navigation device, pager, electronic picket notebook, electronic calculator, word processor, workstation, television phone, POS terminal, and other devices having touch panels. This invention is applicable to displays for use in the aforementioned devices.

As described heretofore, this invention has a variety of technical features and effects, which will be described below.

(1) The electrophoretic device of this invention has a specific structure wherein ferroelectric substance layers are arranged between electrodes, to which a drive voltage is applied with the desired polarity. Due to the provision of the ferroelectric substance layers between the electrodes, it is possible to use the residual polarization characteristics of the ferroelectric substances, which are effective in maintaining the electric dipoles in the electrophoretic dispersion liquid. Thus, it is possible to notably improve the image maintaining capability of the electrophoretic device.

(2) The electrophoretic device of this invention can be manufactured by simple processes that include the formation of microcapsule layers and ferroelectric substance layers in accordance with the inkjet printing method. There are no practical limitations in selecting the materials for use in the manufacture of the electrophoretic device. In addition, it is possible to produce the electronic paper with ease.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

The entire disclosure of Japanese Patent Application No. 2000-304357 filed Oct. 4, 2000 is incorporated by reference herein.

What is claimed is:

1. An electrophoretic device comprising:

a pair of electrodes that are arranged opposite to each other with a prescribed space therebetween, wherein at least one of the electrodes is formed of a transparent material;

an electrophoretic dispersion liquid containing electrophoretic particles dispersed in a liquid phase dispersion medium, which occupies the space between the electrodes; and at least one ferroelectric substance layer that is located at a prescribed position within the space between the electrodes;

wherein the ferroelectric substance layer and the electrophoretic dispersion liquid are electrically connected in series.

2. An electrophoretic device according to claim 1, wherein the ferroelectric substance layer is composed of an organic polymer ferroelectric substance.

3. An electrophoretic device according to claim 1, wherein at least one of the electrodes is partitioned into a plurality of sections in correspondence with pixels.

4. An electrophoretic device comprising:
   a pair of electrodes that are arranged opposite to each other with a prescribed space therebetween, wherein at least one of the electrodes is formed of a transparent material;
   an electrophoretic dispersion liquid containing electrophoretic particles dispersed in a liquid phase dispersion medium, which occupies the space between the electrodes; and
   at least one ferroelectric substance layer that is located at a prescribed position within the space between the electrodes;
   wherein at least one of the electrodes is partitioned into a plurality of sections in correspondence with pixels, and wherein the ferroelectric substance layer is correspondingly partitioned into a plurality of sections in correspondence with the pixels.

5. An electrophoretic device comprising:
   a pair of electrodes that are arranged opposite to each other with a prescribed space therebetween, wherein at least one of the electrodes is formed of a transparent material;
   an electrophoretic dispersion liquid containing electrophoretic particles dispersed in a liquid phase dispersion medium, which occupies the space between the electrodes; and
   at least one ferroelectric substance layer that is located at a prescribed position within the space between the electrodes;
   wherein at least one of the electrodes is partitioned into a plurality of sections in correspondence with pixels, and wherein the ferroelectric substance layer is provided only for desired pixels.

6. A method for manufacturing an electrophoretic device comprising the steps of:
   arranging a pair of electrodes opposite to each other with a prescribed space therebetween, wherein at least one of the electrodes is formed of a transparent material;
   providing an electrophoretic dispersion liquid containing electrophoretic particles dispersed in a liquid phase dispersion medium within the space between the electrodes; and
   forming at least one ferroelectric substance layer, which is composed of an organic polymer ferroelectric substance, at a prescribed position within the space between the electrodes,
   wherein the ferroelectric substance layer is formed using an organic solvent solution for the organic polymer ferroelectric substance in accordance with a prescribed method; and
   wherein the ferroelectric substance layer and the electrophoretic dispersion liquid are electrically connected in series.

7. The method for manufacturing an electrophoretic device according to claim 6, wherein at least one of the electrodes is partitioned into a plurality of sections in correspondence with pixels.

8. A method for manufacturing an electrophoretic device comprising the steps of:
   arranging a pair of electrodes opposite to each other with a prescribed space therebetween, wherein at least one of the electrodes is formed of a transparent material;
   providing an electrophoretic dispersion liquid containing electrophoretic particles dispersed in a liquid phase dispersion medium within the space between the electrodes; and
   forming at least one ferroelectric substance layer, which is composed of an organic polymer ferroelectric substance, at a prescribed position within the space between the electrodes,
   wherein the ferroelectric substance layer is formed using an organic solvent solution for the organic polymer ferroelectric substance in accordance with a prescribed method; and
   wherein at least one of the electrodes is partitioned into a plurality of sections in correspondence with pixels, and wherein the ferroelectric substance layer is correspondingly partitioned into a plurality of sections in correspondence with the pixels.

9. A method for manufacturing an electrophoretic device comprising the steps of:
   arranging a pair of electrodes opposite to each other with a prescribed space therebetween, wherein at least one of the electrodes is formed of a transparent material;
   providing an electrophoretic dispersion liquid containing electrophoretic particles dispersed in a liquid phase dispersion medium within the space between the electrodes; and
   forming at least one ferroelectric substance layer, which is composed of an organic polymer ferroelectric substance, at a prescribed position within the space between the electrodes,
   wherein the ferroelectric substance layer is formed using an organic solvent solution for the organic polymer ferroelectric substance in accordance with a prescribed method; and
   wherein at least one of the electrodes is partitioned into a plurality of sections in correspondence with pixels, and wherein the ferroelectric substance layer is provided only for desired pixels.

10. The method for manufacturing an electrophoretic device according to claim 6, wherein the prescribed method is an inkjet printing method.

11. The method for manufacturing an electrophoretic device according to claim 6, wherein the prescribed method is a screen process printing method.

12. The method for manufacturing an electrophoretic device according to claim 6, wherein the prescribed method is an offset printing method.

13. The method for manufacturing an electrophoretic device according to claim 6, wherein the prescribed method is a spin coating method.

14. The method for manufacturing an electrophoretic device according to claim 6, wherein the prescribed method is a roll coating method.

15. The method for manufacturing an electrophoretic device according to claims 6, wherein a layer of the electrophoretic dispersion liquid is formed after formation of the ferroelectric substance layer by the prescribed method.

16. The method for manufacturing an electrophoretic device according to claim 6, wherein the ferroelectric substance layer is formed by the prescribed method after formation of a layer of the electrophoretic dispersion liquid.

17. An electrophoretic device comprising:
- a pair of electrodes that are arranged opposite to each other with a prescribed space therebetween, wherein at least one of the electrodes is formed of a transparent material;
- an electrophoretic dispersion liquid containing electrophoretic particles dispersed in a liquid phase dispersion medium, which occupies the space between the electrodes;
- at least one ferroelectric substance layer that is located at a prescribed position within the space between the electrodes; and
- a switch enabling repetitive and reversible switching between a parallel connection and a serial connection between a layer of the electrophoretic dispersion liquid and the ferroelectric substance layer.

18. An electrophoretic device according to claim 1, wherein the ferroelectric substance layer is composed of an inorganic dielectric material, which is selected from among lead zirconate titanate (PZT), barium titanate (BaTiO$_3$), and lead titanate.

19. An electrophoretic device according to claim 1, wherein the ferroelectric substance layer is composed of an organic polymer dielectric material, which is selected from among polyvinylidene fluoride (PVDF), copolymers of vinylidene (VDF)/trifluoethylene (TrEE), and copolymers of vinylidene cyanide (VDCN)/vinyl acetate (VAc).

20. An electrophoretic device comprising:
- a pair of electrodes that are arranged opposite to each other with a prescribed space therebetween, wherein at least one of the electrodes is formed of a transparent material;
- an electrophoretic dispersion liquid containing electrophoretic particles dispersed in a liquid phase dispersion medium, which occupies the space between the electrodes; and
- at least one ferroelectric substance layer that is located at a prescribed position within the space between the electrodes;
- wherein the ferroelectric substance layer and the electrophoretic dispersion liquid are electrically connected in parallel.

21. A method for manufacturing an electrophoretic device comprising the steps of:
- arranging a pair of electrodes opposite to each other with a prescribed space therebetween, wherein at least one of the electrodes is formed of a transparent material;
- providing an electrophoretic dispersion liquid containing electrophoretic particles dispersed in a liquid phase dispersion medium within the space between the electrodes; and
- forming at least one ferroelectric substance layer, which is composed of an organic polymer ferroelectric substance, at a prescribed position within the space between the electrodes,
- wherein the ferroelectric substance layer is formed using an organic solvent solution for the organic polymer ferroelectric substance in accordance with a prescribed method; and
- wherein the ferroelectric substance layer and the electrophoretic dispersion liquid are electrically connected in parallel.

22. An electophoretic device comprising:
- a pair of electrodes arranged opposite to each other;
- an electrophoretic dispersion liquid containing electrophoretic particles dispersed in a liquid phase dispersion medium and arranged between the electrodes; and
- a capacitance arranged in a space between the pair of electrodes with respect to each pixel, the capacitance being capable of maintaining the state of the electrophoretic dispersion liquid,
- wherein the capacitance and the electrophoretic dispersion liquid are electrically connected in series.

23. An electrophoretic device according to claim 22, wherein at least one of the electrodes is partitioned into a plurality of sections in correspondence with pixels respectively.

24. An electrophoretic device according to claim 22, wherein at least one of the electrodes is partitioned of sections in correspondence with pixels respectively, and wherein the capacitance is correspondingly partitioned into a plurality of sections in correspondence with the pixels respectively.

25. An electrophoretic device according to claim 22, wherein at least one of the electrodes is partitioned into a plurity of sections in correspondence with pixels respectively, and wherein the capacitance arranged only for desired pixels.

26. An electrophoretic device comprising:
- a pair of electrodes arranged opposite to each other;
- an electrophoretic dispersion liquid containing electrophoretic particles dispersed in a liquid phase dispersion medium and arranged between the electrodes; and
- a capacitance arranged in a space between the pair of electrodes with respect to each pixel, the capacitance being capable of maintaining the state of the electrophoretic dispersion liquid,
- wherein the capacitance and the electrophoretic dispersion liquid are electrically connected in parallel.

27. An electrophoretic device according to claim 26, wherein at least one of the electrodes is partitioned into a plurality of sections in correspondence with pixels respectively.

28. An electrophoretic device according to claim 26, wherein at least one of the electrodes is partitioned into a plurity of sections in correspondence with pixels respectively, and wherein the capacitance is correspondingly partitioned into a plurality of sections in correspondence with the pixels respectively.

29. An electrophoretic device according to claim 26, wherein at least one of the electrodes is partitioned into plurality of sections in correspondence with pixels respectively, and wherein the capacitance is arranged only for desired pixels.

* * * * *

UNITED STATES PATENT AND TRADEMARK OFFICE
CERTIFICATE OF CORRECTION

PATENT NO. : 6,724,520 B2
DATED : April 20, 2004
INVENTOR(S) : Kawai

It is certified that error appears in the above-identified patent and that said Letters Patent is hereby corrected as shown below:

Title page,
Item [75], Inventor, "Suwa (JP)" should be -- Fujimi-cho (JP) --

Column 15,
Line 26, "(TrEE)" should be -- (TrFE) --

Column 16,
Lines 29 and 50, "plurity" should be -- plurality --
Line 30, after "capacitance" insert -- is --
Line 55, after "into" insert -- a --

Signed and Sealed this

Twenty-eighth Day of December, 2004

JON W. DUDAS
*Director of the United States Patent and Trademark Office*